United States Patent [19]

Martin

[11] Patent Number: 5,578,205
[45] Date of Patent: Nov. 26, 1996

[54] PLANT FOR REMOVING MICROPOLLUTANTS FROM UNTREATED WATER BY THE COMBINED ACTION OF OZONE AND HYDROGEN PEROXIDE

[75] Inventor: Nathalie Martin, Paris, France

[73] Assignee: Trailigaz, Garges-Les-Gonesses, France

[21] Appl. No.: 448,495

[22] PCT Filed: Nov. 24, 1993

[86] PCT No.: PCT/FR93/01155

§ 371 Date: May 23, 1995

§ 102(e) Date: May 23, 1995

[87] PCT Pub. No.: WO94/12437

PCT Pub. Date: Jun. 9, 1994

[30] Foreign Application Priority Data

Nov. 24, 1992 [FR] France .................. 92 14427

[51] Int. Cl.$^6$ .................................................. B01D 21/34
[52] U.S. Cl. ........................ 210/199; 210/205; 210/220
[58] Field of Search ............................. 210/198.1, 199, 210/205, 206, 220, 202, 627, 758, 759, 760

[56] References Cited

U.S. PATENT DOCUMENTS

| | | | |
|---|---|---|---|
| 5,011,599 | 4/1991 | Kearney et al. ........................ | 210/220 |
| 5,015,394 | 5/1991 | McEllhenney et al. ................ | 210/220 |
| 5,256,299 | 10/1993 | Wang et al. ............................. | 210/694 |
| 5,273,664 | 12/1993 | Schulz .................................... | 210/220 |
| 5,403,476 | 4/1995 | Bernhardt ............................... | 210/220 |
| 5,460,723 | 10/1995 | Bourbigot et al. ..................... | 210/259 |

FOREIGN PATENT DOCUMENTS

| | | |
|---|---|---|
| 0144952 | 6/1985 | European Pat. Off. . |
| 0244565 | 11/1987 | European Pat. Off. . |
| 0287205 | 10/1988 | European Pat. Off. . |
| 0495707 | 7/1992 | European Pat. Off. . |
| 2563208 | 10/1985 | France . |
| 2045603 | 4/1971 | Germany . |
| 2020800 | 11/1971 | Germany . |
| 3830999 | 3/1990 | Germany . |

*Primary Examiner*—W. L. Walker
*Attorney, Agent, or Firm*—Kinney & Lange, P.A.

[57] ABSTRACT

A plant for processing untreated water, particularly drilling water, to at least partially remove mircopollutants thereform. The plant includes at least one main feed pipe for feeding water into the bottom of a reactor via a submerged inlet at end of said main pipe for delivering ozone into the water, a means communicating with said main pipe for delivering hydrogen peroxide into the water, at least one liquid gas transfer system including at least one static mixer downstream from said ozone delivery means and said hydrogen peroxide delivery means, and upstream from said reactor; and a means for evenly distributing the flow of water out of said feed pipe and through the inlet and allowing a drop in the kinetic energy of the water as it enters said reactor.

22 Claims, 6 Drawing Sheets

PLANT FOR REMOVING MICROPOLLUTANTS FROM UNTREATED WATER BY THE COMBINED ACTION OF OZONE AND HYDROGEN PEROXIDE

BACKGROUND OF THE INVENTION

The field of the invention is that of the treatment of untreated water. More specifically, the invention relates to the removal or, at least, to the high abatement of the micropollution contained in untreated water and, particularly, in drilling water.

Untreated water contains little colloidal organic matter and it is generally unnecessary to make it undergo treatment constituted by a succession of steps of the flocculation-decantation-filtration type. On the contrary, this untreated water is generally charged with micropollutants, and may contain microorganisms or again reduced mineral compounds (ferrous iron, manganese etc.).

The removal of the micropollutants can be done, for example, by stripping (forced air circulation) if they are volatile or by adsorption on active carbon or on other types of materials such as ion-exchanger resins or again by physical separation with methods using nanofiltration membranes and reverse osmosis. All these last-named methods may be very efficient but have the drawback of not destroying the pollution but only of holding it back.

It has therefore appeared to be necessary to use oxidizing techniques for the removal or high abatement of the micropollutant content of this untreated water. Although certain prior art techniques consist in using chlorine or chlorine dioxide, ozone has appeared to be the most useful oxidant because it is capable of completely destroying organic matter by mineralizing it into $CO_2$ and mineral salts under certain conditions of implementation. Ozone is also used for the depollution of water lightly charged with organic pollutants and notably in the context of making consumption water potable. For, the ozone molecule permits radical reactions involving the $OH°$ radical enabling the organic matter to be highly oxidized.

One of the major problems encountered in the context of the treatment of untreated water with a view to making it potable lies in the presence, in this water, of particular organic micropollutants constituted by pesticides, insecticides, fungicides, herbicides and rodenticides. Indeed, these organic compounds cannot flocculate and are difficult to remove by conventional means of oxidation. Since these micropollutants, even in low doses, have high toxicity, one of the priorities of the water treatment is to further their removal to the utmost possible extent.

Among these compounds, we may note for example the frequent presence in drilling water of atrazine and simazine which are herbicides.

Atrazine is constituted by 2-chloro-4-ethylamino-6-isopropylamino-6 s-triazine. The simazine molecule is 2-chloro-4,6-bis(ethylamino-)-s-triazine.

The abatement of these pesticidal compounds during the conventional flocculation-decantation step is very low and, on an average, about 5%. After the operation of fast filtration on sand, the abatement reaches an average of 20%. The use of an ozonization unit after a sand filter using a low treatment rate of the order of 0.85 mg $O_3/l$ leads to a final abatement of 30%. This final abatement does not often allow for reaching the prescribed standards for potable water which, in the case of atrazine, is 0.1 µg/l. It is therefore necessary to have recourse to a higher ozone rate. A ozone level of 4 mg $O_3/l$ enables the atrazine concentration to be reduced by 60%. Although it is further possible to improve this abatement by further increasing the ozone level injected into the water to be treated, there are then encountered problems of cost and especially problems relating to the removal of residual ozone in the treated water. It is then necessary to extend the contact time of the ozonized water coming out of the ozonization units, for example by making this water pass into contact columns fostering the degassing of this residual ozone. For example, it may be necessary, after a contact time of two minutes in the prior art ozonization units, to extend the contact time for eight minutes by making the ozonized water pass into a large-sized reactor so that the residual ozone contained in them can be essentially removed.

In the prior art, there are known plants for disinfection by ozone provided with contactors with diffusion of ozone by porous structures. Such plants have many drawbacks, due essentially to the deterioration of the pores in the course of time. Furthermore, and as mentioned here above, it is necessary, in order to ensure the minimum contact time necessary for the totality of the liquid to be treated, to maintain a substantial average time of passage in the reactors. This in particular calls for oversized structures that are costly and use space.

Besides, another problem presented by the ozonization reactors using porous structures lies in the fact that they may induce a lack of homogeneity of the ozone concentration in the water to be treated.

SUMMARY OF THE INVENTION

An aim of the invention is to palliate the drawbacks of the prior art ozonization reactors used to depollute untreated water.

The main aim of the invention is thus to enable the intensive removal of the micropollutants and, more particularly, of the organic pesticides from the untreated water such as drilling water by means of oxidants while at the same time reducing the contact time of the treated water with said oxidants and, concomitantly, by obtaining a low residual rate of oxidant products in the treated water. In other words, one of the aims of the present invention is to provide a plant for the treatment of untreated water by oxidation wherein the operation for placing the oxidant products in contact with water is optimized.

It is also an aim of the invention to provide a high-output plant enabling a considerable reduction in the sizing of the civil engineering structures commonly used in the treatment of untreated water, and even the complete elimination of these structures.

Another aim of the invention is to provide a treatment plant with minimized time of passage of the liquid to be treated in a reactor, while at the same time enabling the efficient removal of micropollution.

Yet another aim of the invention is to propose a plant enabling the removal of micropollution from untreated water such as drilling water, capable of being used at a wide range of flow-rates of said water.

These aims as well as others that shall appear hereinafter are achieved by means of a plant for the treatment of untreated water, notably drilling water, enabling the removal, at least partially, of the micropollutants contained in said water, characterized in that said plant comprises:

at least one main feed pipe for feeding said water into the lower part of a reactor, the end of the feed pipe that joins said reactor forming a submerged outlet;

means for the injection of ozone into said water communicating with said main feed pipe;

means for the injection of hydrogen peroxide into said water communicating with said main feed pipe;

at least one gas-liquid transfer system comprising at least one static mixer, said static mixer being located downstream from said ozone-injection means and said hydrogen peroxide injection means and upstream from said reactor; and means enabling the equal distribution of the flow of resurgent water from said feed pipe at the outlet, said means of equal distribution permitting a reduction of the kinetic energy of said water when it arrives in said reactor.

The invention therefore consists in using the oxidant pair formed by ozone and hydrogen peroxide for the treatment of untreated water in a plant including a system of gas/liquid transfer enabling the homogenization, upstream from the reactor, of these oxidants with the water to be treated.

Hydrogen peroxide has a peroxide 0—0 bridge characteristic of per-compounds. However, its oxidant properties do not result from the presence of an active oxygen atom in the molecule. Indeed, its reactivity leads to its being classified in the category of weak oxidants, whether in an aqueous solution or in an anhydrous medium. However, like all peroxides, it has the possibility of taking part in radical reactions liable to activate the production of oxidant entities by the breaking of the peroxide bond.

Although it is known that hydrogen peroxide, commonly called oxygenated water, is a powerful oxidant of organic matter, it has never been used, to the Applicant's knowledge, in the context of a plant for the treatment of untreated water, to be injected in combination with ozone upstream from a small volume of contact with said water.

According to the invention, the treatment of untreated water with a view to removing the micropollutants that it contains or to sharply abate the level of these compounds in the water is thus divided into three steps: the addition of the oxidant pair formed by ozone and hydrogen peroxide to the untreated water upstream from the reactor and more specifically at the untreated water feed pipe, the homogenization of the mixture of untreated water and oxidant products at the static mixer of the gas-liquid transfer system, always upstream from the reactor and degassing in said reactor.

Thus, through the architecture of the plant according to the present invention, it is possible notably to shorten the time taken for the treatment of the untreated water with a view to ridding it of the micropollutants that it contains. First of all, by means of the combined use of two powerful oxidants causing radical reactions, namely the ozone and the hydrogen peroxide and, secondly, by the placing of the oxidant products in contact with the untreated water not at the reactor but prematurely at the feed pipe for feeding untreated water to be treated to the reactor. The gas-liquid separation therefore occurs as soon as the ozonized water enters into the reactor. Consequently, the time of passage of this ozonized water into said reactor is by itself sufficient to enable efficient degassing and thus reduce or even remove the civil engineering installation conventionally used in the prior art plants to increase the contact time of the ozone with the treated water and to permit an acceptable diminishing of the residual quantities of ozone in this water.

The plant according to the invention thus enables a considerable reduction of the cost of the untreated water processing units since a substantial part of these costs, namely the civil engineering structure hitherto needed to increase the contact time of the water and ozone and reduce the quantity of residual ozone in the treated water becomes at least partially unnecessary.

Furthermore, the high turbulence caused in the treatment water by the static mixer or mixers of the present plant makes it possible to weaken numerous microorganisms present in the untreated water and thus collaborate in their destruction, in parallel with the action of the oxidant pair formed by ozone and hydrogen peroxide.

The means for the equal distribution of the flow are designed to "break" the stream of untreated water coming from the main feed pipe for feeding this water to the reactor, this feed pipe generally leading into the axis and into the lower part of the reactor. Since the kinetic energy of this water is dissipated, the distribution of the flow in upper part of the reactor is appropriate. Such a distribution of the flow-rate of water is useful to homogenize the treatment of water and prevent the localized concentration of oxidants in order to enable a more efficient degassing operation.

Preferably, said means of equal distribution are constituted by a submerged plate fixed above said outlet essentially perpendicularly to the direction of arrival of the water in said reactor, said plate having firstly a width substantially equal to the width of said reactor and, secondly, a solid central part and an open-worked peripheral ring, said solid central part being placed essentially so as to face said feed pipe for feeding water into said reactor. The distance between the end of the main feed pipe for feeding ozonized water into the reactor and the submerged plate is computed so as to optimize the equal distribution of the flows. Consequently, such a plate should not be placed too close to the main feed pipe so as not to give rise to any flow of water into the feed pipe. Nor should it be placed at too great a distance so that it can fulfill its role of breaking the force of the resurgent water flowing from this feed pipe.

Advantageously, said central part of said submerged plate has a diameter substantially equal to that of said feed pipe for feeding water into said reactor.

According to a preferred variant of the invention, said hydrogen peroxide injection means are placed upstream from said ozone injection means in such a way that the injection of hydrogen peroxide can be done into non-ozonized untreated water.

Also advantageously, the plant includes a bypass loop communicating with said main feed pipe for feeding said water into said reactor, said loop constituting an auxiliary feed pipe for the feeding of said water into said reactor, said auxiliary feed pipe enabling the feeding of said water into said reactor up to a threshold value of the flow-rate of this water, said main feed pipe providing for the feeding of said water into said reactor as soon as the flow-rate of said water is greater than said threshold.

According to one mode of implementation of the invention, said ozone injection means are set up at said auxiliary feed pipe.

Preferably, said ozone injection means and said hydrogen peroxide injection means enable the injection of these two compounds into said water according to a constant $H_2O_2/O_3$ weight ratio.

Advantageously, said $H_2O_2/O_3$ weight ratio is at least equal to 0.3 g/g.

According to a preferred aspect of the invention, the plant comprises a filtration unit positioned downstream from said reactor, said filtration unit making it possible to increase the rate of removal of the micropollutants from the treated water. Said filtration unit, which has a complementary role in the removal of the micropollutants, may advantageously comprise one or more layers of active granular carbon, it being possible then for the residual micropollution contained in the water coming out of said reactor to be retained by adsorption on said grains. Such an operation of filtration on active carbon this enables a complementary refining of the water, by completing a physical and biological filtration at the same time.

According to one embodiment, said filtration unit may be positioned co-cylindrically with respect to said reactor, said reactor then forming a first central chamber and said filtration unit forming a second annular chamber.

Whether the filtration unit is built co-cylindrically or not with respect to said reactor, it is possible to envisage several variants of circulation of the treated water in these two modules. Thus, the filtration unit and the reactor could be designed so that the water can undergo a rising motion in the reactor and a descending motion in the filtration unit, the end of said feed pipe then joining the lower part of said reactor, and said reactor being fitted out, in its upper part, with an outlet enabling the untreated water that has been treated in said reactor to be conveyed towards said filtration unit. In such an embodiment, the water feed pipe could reach the reactor by the top or by the bottom of this reactor.

According to another embodiment, it is possible to give a descending motion to the water in the reactor and a rising motion to the water in the complementary filtration unit. To this effect, the end of the feed pipe for the feeding of ozonized water into the reactor will be set up in the upper part of the reactor and the passage of the water coming out of this reactor to the filtration unit will be organized at the bottom of this unit.

In this case too, the water feed pipe could arrive in the reactor by the top of the reactor or by its bottom.

Finally, according to another alternative embodiment according to the present invention, it is possible to envisage the designing of said reactor and said filtration unit so as to give the water a descending motion in said reactor and also a descending motion in the complementary filtration unit, or again a rising motion in the two units, the wall between the reactor and the filtration unit then forming a siphon-shaped wall.

Also according to one variant of the invention, said hydrogen peroxide injection means comprising a dynamic or static dilution element enabling the injection of diluted hydrogen peroxide into said water.

According to another variant, said hydrogen peroxide injection means permit the injection of concentrated hydrogen peroxide into said water.

When the untreated water to be treated also has pollutants other than pesticides such as reduced mineral compounds (iron, manganese etc.), it is useful to introduce at least one flocculent substance into the reactor in order to bring about the flocculation of these compounds while, at the same time, permitting their oxidation through the ozone micro-bubbles formed within the reactor.

To achieve this end, the plant preferably comprises:

means for the production of ozone over-saturated water;

means for the introduction of the over-saturated water formed and at least one coagulant substance into the reactor, and, means for the removal of the flocs formed on the surface of the reactor.

The introduction of water over-saturated with ozone into the reactor enables the making, by pressure release, of ozone micro-bubbles which, combined with the action of the coagulant substance, lead to the floating of the pollutants.

The means used for the removal of the flocs make it possible to prevent the clogging of the filters of said filtration unit.

According to one variant of the invention, the plant preferably includes means for the pressurizing of the water to be treated in said reactor, which then works under pressure, and possibly in said filtration unit. Such means make it possible to prevent the repumping of the treated water conventionally done in a plant including an ozonizing unit and a conventional filtering unit.

According to yet another variant of the invention, the plant includes means for the ozone over-saturation of the treated water coming out of said plant and means for the injection of ozone over-saturated water into the water. An embodiment such as this is particularly valuable when the plant has no filtration unit and when it is desired to reinject ozone, for example as a complement, for purposes of disinfection. The plant also has two ozone injection points, one at the inlet to the reactor and the other at another point. It will also be noted that it is also possible to envisage the reinjecting of the hydrogen peroxide at the outlet of the reactor. This constitutes a staged treatment ensuring a perfect treatment of the entire flow of water.

BRIEF DESCRIPTION OF THE DRAWINGS

Other features and advantages of the invention shall appear from the following description of preferred modes of implementing the plant of the invention, presented by way of a non-restrictive illustration, and from the appended drawings, of which.

DETAILED DESCRIPTION OF THE PREFERRED EMBODIMENTS

The basic principle of the invention consists in treating the untreated water both with ozone and with hydrogen peroxide by introducing these oxidizing compounds upstream from their arrival in a reactor and by organizing the mixing of this water also upstream from their arrival in the reactor.

Figure 1:
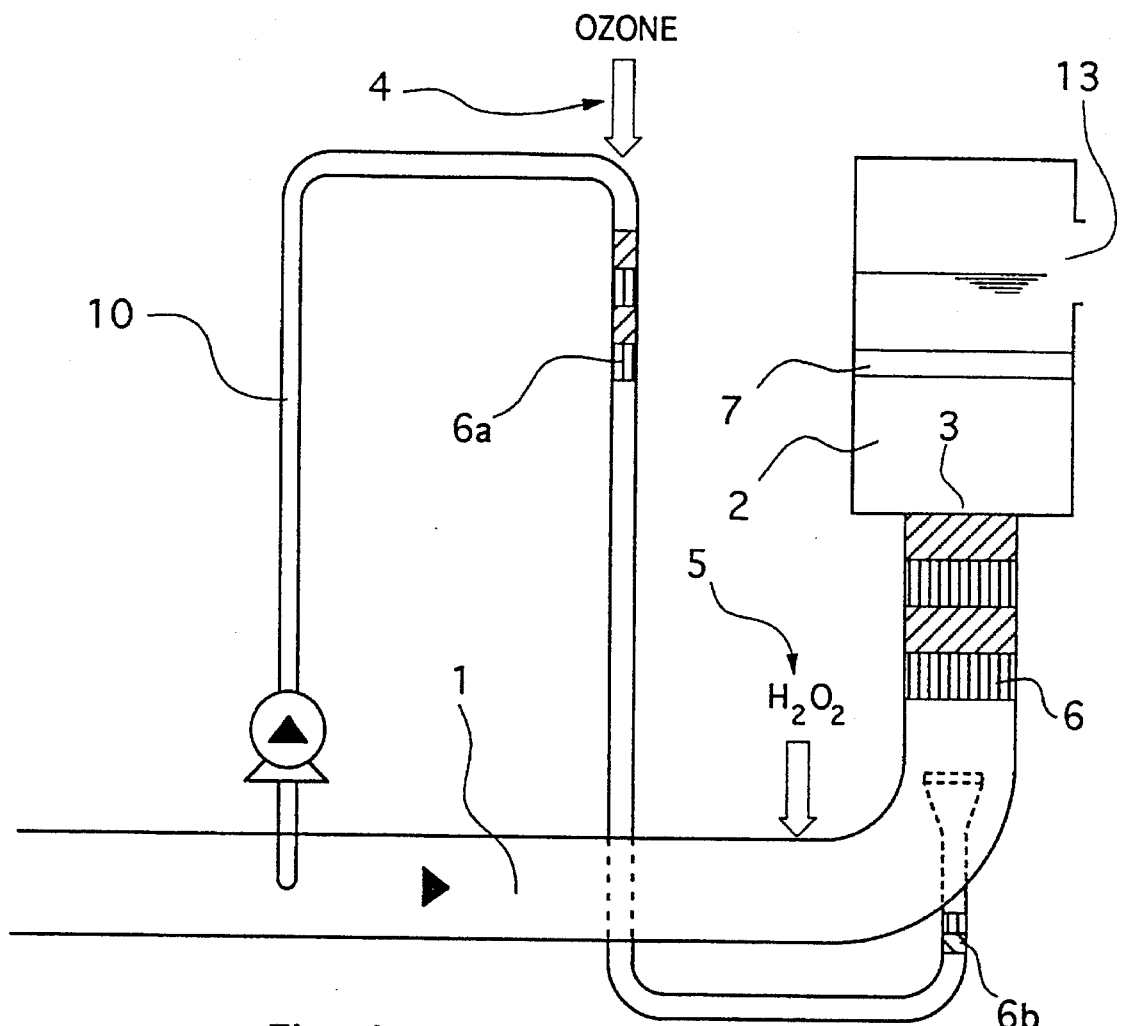
FIG. 1 presents a schematic view shown the principle of a plant for the removal of micropollutants from untreated water according to the present invention.

FIG. 1 shows the different elements of a plant for the removal of micropollutants from untreated water constituted by drilling water. This drilling water has a certain pesticide content and, more particularly, an atrazine content.

According to the invention, the plant has a main feed pipe 1 for the feeding of untreated drilling water into a reactor 2. This main feed pipe is fitted out with a bypass loop forming an auxiliary feed pipe 10 and having, as its object, the conveying of the untreated drilling water to the reactor 2 up to a certain threshold of flow-rate of this water. In the context of the embodiment of the present example, the feed pipe 10 is designed so as to work at a fixed flow-rate of 400 $m_3$ per hour.

The plant shown in FIG. 1 has been sized so as to enable the treatment of untreated water having a flow-rate that may range from 500 m3 to 3,500 $m_3$ per hour. Whatever the flow-rate of the water to be treated, the ozone is injected entirely at the bypass loop. In order to enable the removal of he micropollutants contained in the drilling water to be treated, and notably the elimination or almost the elimination of the pesticides, the plant is provided with:

ozone injection means 4;

hydrogen peroxide injection means 5;

and a gas/liquid transfer system formed by a main static mixer 6 located on the main feed pipe 1 and by two static mixers 6a, 6b located on the auxiliary feed pipe 10.

In accordance with the invention, the ozone injection means 4 and the hydrogen peroxide injection means are located upstream from the main static mixer 6.

According to a preferred characteristic of the invention, the means for the injection of ozone into the untreated water are installed at the auxiliary feed pipe 10. Thus, this auxiliary feed pipe 10 constitutes an over-ozonizing loop. In any case, the quantity of ozone is sufficient for the treatment, in combination with the quantity of hydrogen peroxide, of the pesticide-charged drilling water.

Furthermore, the means for the injection of hydrogen peroxide into the untreated water are located upstream from the ozone injection means so that the hydrogen peroxide is injected into the non-ozonized untreated water. To this end, the auxiliary feed pipe 10 leads into the main feed pipe 1 downstream from the hydrogen peroxide injection means, the injection of ozone taking place in this auxiliary feed pipe 10.

The main static mixer, for its part, is mounted at the incoming part of the main feed pipe 1 in the reactor 2. The end 3 of this feed pipe leads into the lower part of the reactor 2.

Means for the equal distribution of the flow-rate of the water arriving in the reactor constituted by a submerged plate 7 are furthermore planned at an adequate distance from the end 3 of the feed pipe 1 so as to reduce the kinetic energy of the resurgent ozonized water. Such a plate 7 makes it possible to homogenize the flow-rates of the water arriving in the reservoir 2 and hence to foster the degassing and the reaction leading to the destruction of the organic micropollution contained in the treated water.

Figure 2:
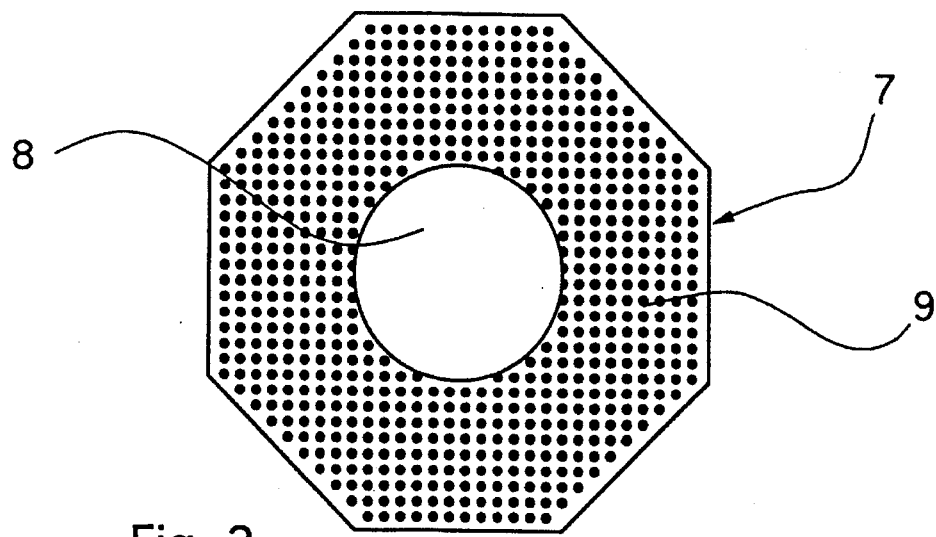
FIG. 2 shows a top view of the means for the equal distribution of the flow of ozonized water reaching the reactor of the plants shown in FIGS. 1, and 3 to 5.

As can be seen in FIG. 2, said submerged plate 7 takes the form of a hexagonal plate having a solid central part 8 and an open-worked peripheral part 9. The solid central part 8 has a diameter substantially equivalent to the diameter of the main feed pipe at the reactor 2. Furthermore, the plate 7 has a width substantially equal to the width of the reactor 2. According to this characteristic, the essential part of the resurgent water from the main feed pipe 2 meets the plate 7 and thus enables the equal distribution of its flow. The treated water according to the plant shown in FIG. 1 may be rid of the essential part of their micropollution without its being necessary to build a civil engineering structure, such as a contact column downstream from this plant. Such a plant furthermore plays a part in considerably reducing the number of microorganisms present in the untreated drilling water and thus in disinfecting this water.

According to the invention, the formation of the mixture of water to be treated+ozone+hydrogen peroxide upstream from the reactor, i.e. prematurely, and the use of static mixers, also upstream from this reactor, enable the oxidant products constituted by the ozone and the hydrogen peroxide to act very early. The submerged plate for the equal distribution of the flows furthermore makes it possible to foster the homogenization of the ozonized and peroxidized water so as to foster the increasing of the degassing and thus the optimizing of the removal of the micropollutants.

Figure 3:
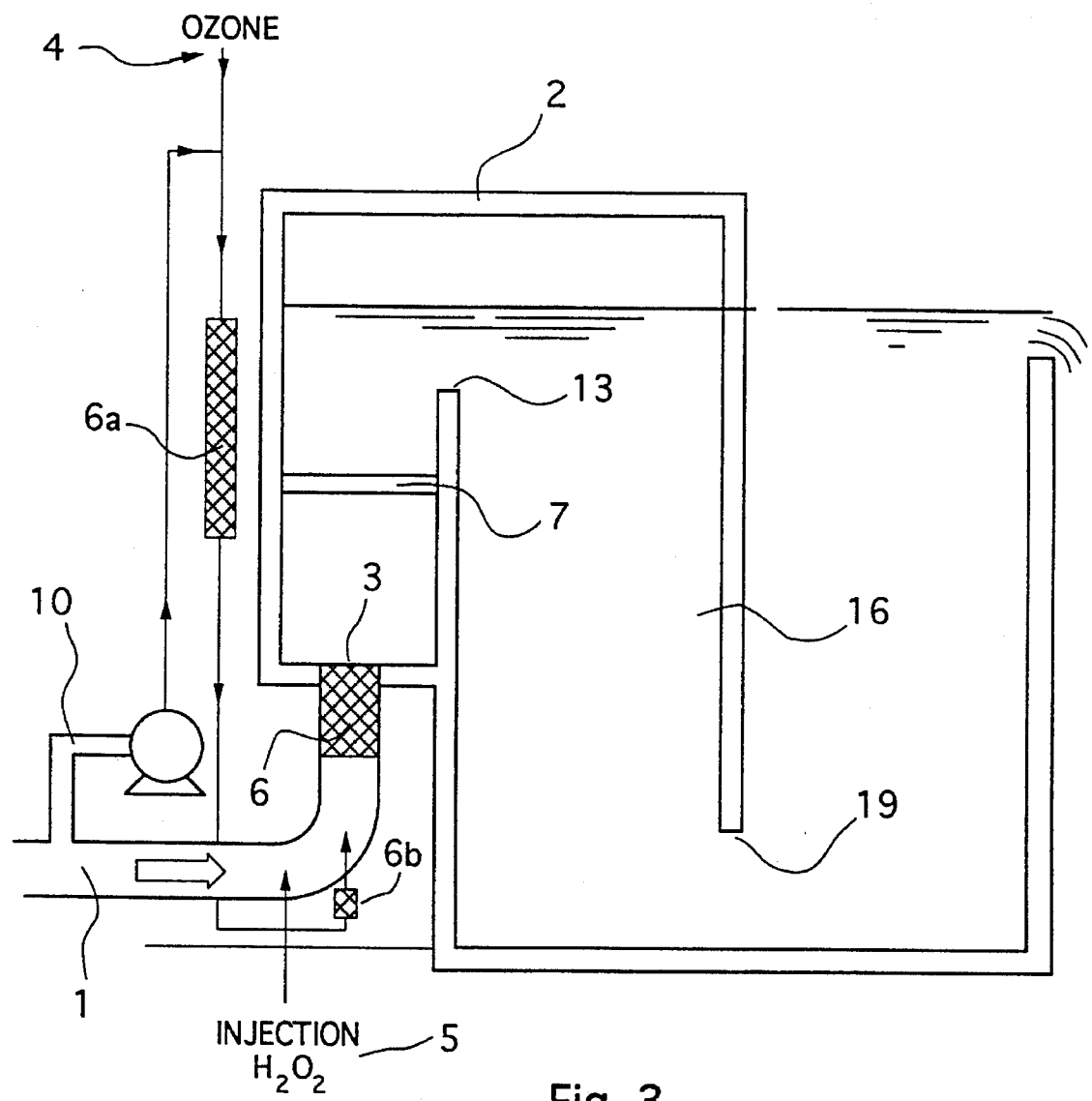
FIG. 3 shows a side view of an embodiment of a plant according to the invention, including a small-sized civil engineering structure at the exit from the reactor.
Figure 4:
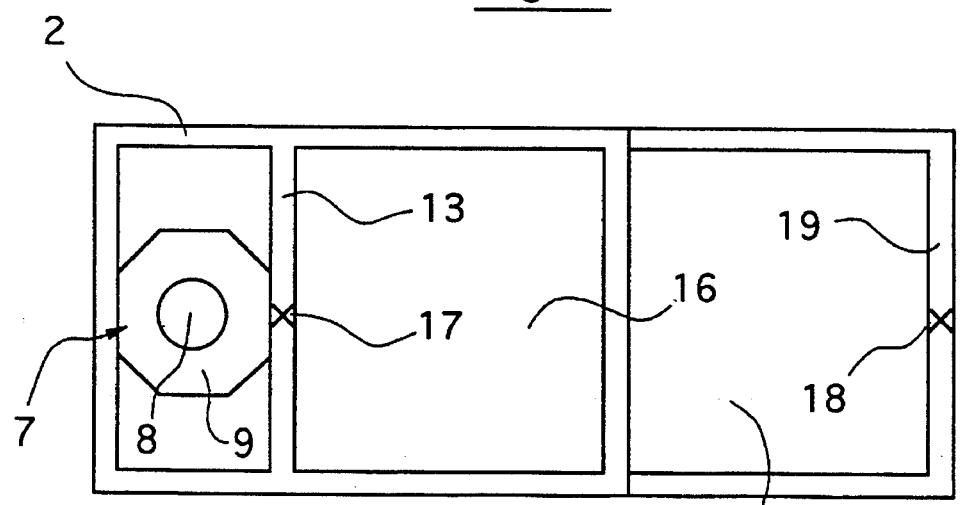
FIG. 4 shows a top view of the plant shown in FIG. 3.

According to another embodiment shown in FIGS. 3 and 4, a plant substantially identical to the one shown in FIG. 1 is built upstream from a small-sized civil engineering structure formed by a contact column with two compartments 16, 20 making it possible to intensify the removal of the residual ozone present in the treated water. For a water flow-rate of 3,500 m3 per hour, the height of water in this contact column is about 5.50 m.

In FIG. 4, tapping points 17 and 18 located respectively at the outlet 13 of the reactor 2 and at the outlet 19 of the second compartment 20 of the contact column are planned so as to measure the rates of residual ozone and atrazine concentration in the treated water. The reactor 2 is provided with a thermal destroyer (not shown) enabling the removal of the gaseous ozone coming from the ozonized water present in the reactor 2. The ozone transfer rate, computed from the quantifies of injected ozone and the quantities of ozone destroyed by the thermal destroyer, is substantially constant and equal to 90 per cent. The plant shown in FIGS. 2 and 3 has been tested in using mean ozone treatment rate varying from 2.1 to 4.8 $g/m^3$ for an $H_2O_2/O_3$ ranging from 0.4 g/g to 0.6 g/g.

The results relating to the abatement of atrazine at the outlet from the reactor, measured at the tapping point 18, are given in the table I below. This table mentions, for each test, the water flow-rate, the ozone treatment rate, the $H_2O_2/O_3$ ratio, the atrazine content of the untreated water UW and the atrazine content of the treated water TW at the outlet of the reactor 2, as well as the abatement rate obtained.

TABLE I

| Test No. | $Q_{water}$ $m^3/H$ | Ozone treatment rate ($g/m^3$) | $H_2O_2/O_3$ rate (g/g) | UW Atrazine (ng/l) | TW Atrazine (ng/l) | abatement rate % |
|---|---|---|---|---|---|---|
| 1 | 1750 | 2.5 | 0.6 | 235 | 40 | 82 |
| 2 | 920 | 4.8 | 0.4 | 235 | <40 | 82 |
| 3 | 1700 | 2.6 | 0.4 | 235 | <40 | 82 |
| 4 | 2080 | 2.3 | 0.6 | 220 | 40 | 81 |
| 5 | 1800 | 2.1 | 0.6 | 220 | 40 | 81 |
| 6 | 1300 | 3.3 | 0.6 | 210 | 40 | 81 |
| 7 | 650 | 2.2 | 0.6 | 210 | 40 | 81 |
| 8 | 2100 | 2.9 | 0.6 | 215 | <40 | 81 |

This table shows that, for a $H_2O_{2/O3}$ with little variation, and for flow-rates varying by a factor of one to three, a substantial abatement of more than 80% is obtained at the very outlet of the reactor 2. Complementary measurements of the atrazine content at the tapping point 17 of the contact column built downstream from the reactor 2, corresponding to a shorter contact time, show that the improvement of the atrazine abatement rate remains minimal. Thus, measurements of the atrazine content at the tapping point 17 give an atrazine concentration of only 60 ng/l. This proves that the essential part of the organic micropollution is destroyed during the passage of the untreated water in the reactor.

The time of passage of this untreated water in this reactor is greatly reduced since it is only 0.38 min. Consequently, the plant according to the invention has a very great advantage as compared with the different prior art devices which all require far greater contact times with ozone, of the order of ten minutes.

The plant therefore makes it possible to arrive at an almost instantaneous abatement of atrazine, even for high flow-rates. The baffle-plated structure 16 built downstream from the reactor 2 therefore has only one effect which is to reduce the content of residual ozone in the treated water. Table II shows, for each of the tests 1 to 8 performed, the residual quantities of ozone measured at the tapping points 17 and 18 (see FIG. 4) in the treated water, located respectively at the outlet 13 of the reactor 2 and the outlet 19 of the compartment 20 of the contact column. Except for the results of the test No. 1 and the test No. 2, it is observed that the small-sized civil engineering structure enables the appreciable abatement of the residual content of dissolved ozone in the treated water.

TABLE II

| test No. | Tapping point | Residual $O_3$ g/m$^3$ |
|---|---|---|
| 1 | 17 | 0.43 |
|   | 18 | 0.54 |
| 2 | 17 | 0.41 |
|   | 18 | 0,20 |
| 3 | 17 | 0.60 |
|   | 18 | 0.52 |
| 4 | 17 | 0.28 |
|   | 18 | 0.28 |
| 5 | 17 | 0.36 |
|   | 18 | — |
| 6 | 17 | 0.47 |
|   | 18 | 0.41 |
| 7 | 17 | 0.36 |
|   | 18 | 0.25 |
| 8 | 17 | 0.52 |
|   | 18 | 0.37 |

Figure 5:
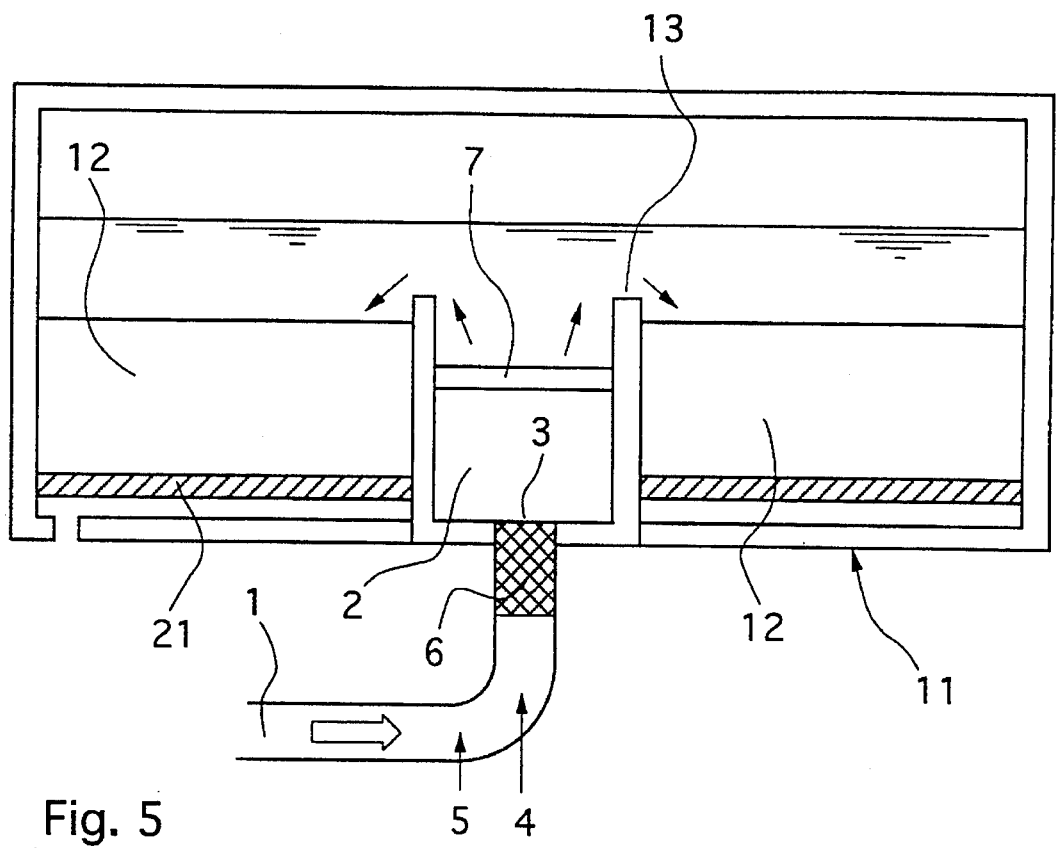
FIG. 5 shows a second embodiment of a plant according to the present invention including an annular filtering chamber that completes the removal of the micropollution of the water treated in the reactor.
Figure 6:
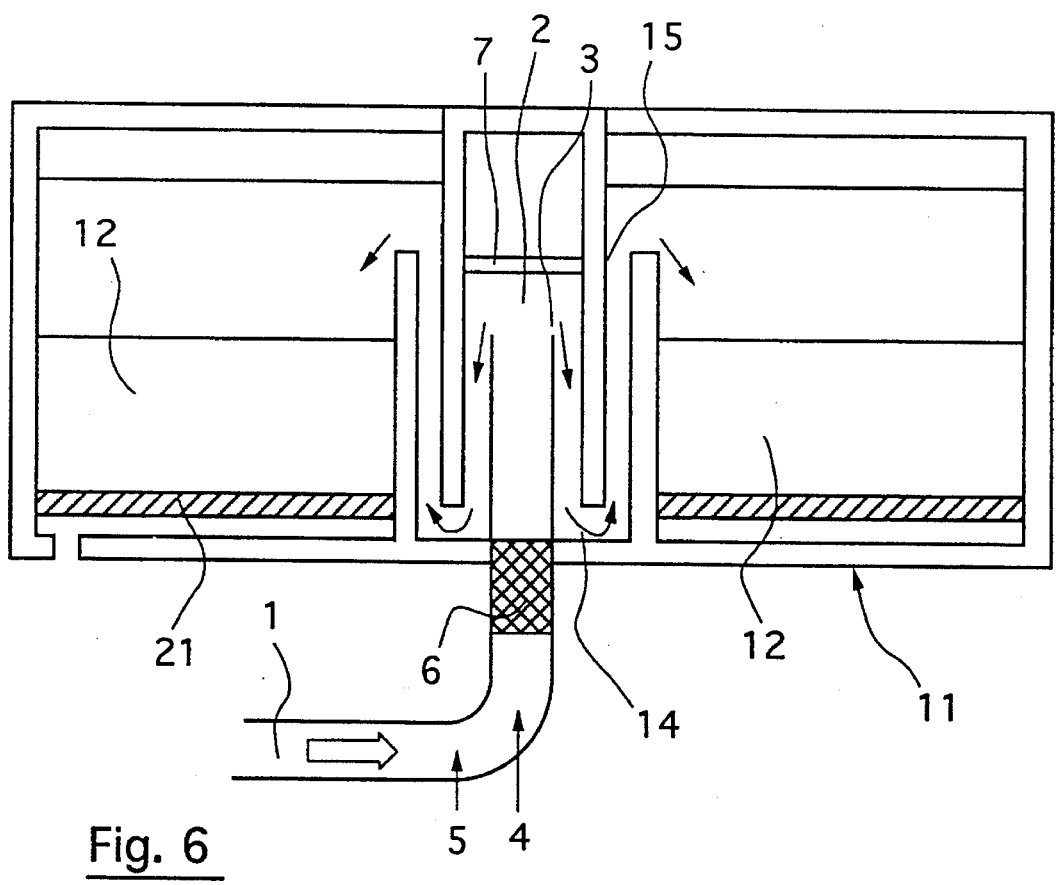
FIGS. 6 and 7 show a third and fourth embodiment of a plant according to the present invention, also including a co-cylindrical filtering chamber.
Figure 7:
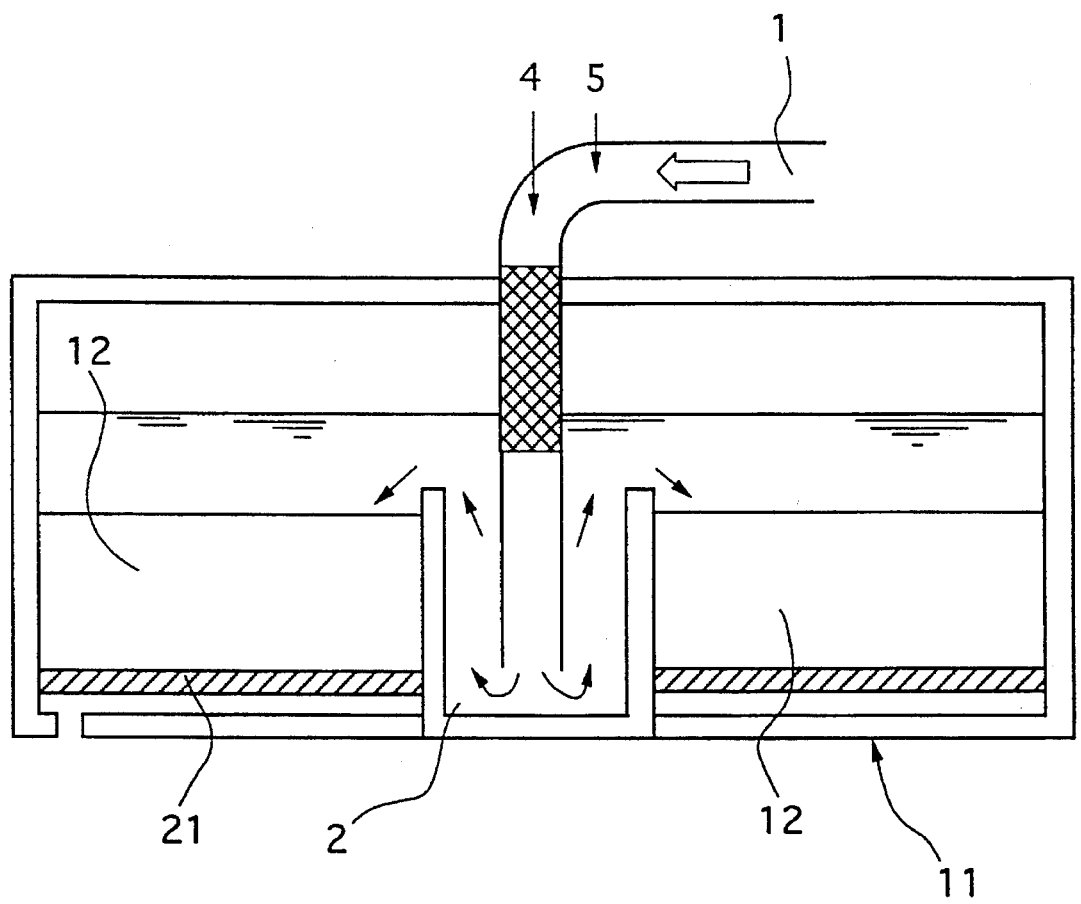

According to FIGS. 5, 6 and 7, the plant according to the present invention can also include a filtering unit 11 built downstream from the reactor 2 and enabling a further increase in the rate of removal of the organic micropollution contained in the treated water.

According to FIG. 5, a plant of the type shown in FIG. 1 is fitted out with a filtration unit 11 comprising a layer of active granular carbon and a filtering floor 21. This filtration unit is positioned concentrically with respect to the reactor 2, the reactor 2 then forming a central chamber and the filtering unit constituting an annular chamber. The working of the layer of active carbon used is a conventional one.

The water coming out of the reactor 2 and having a substantially constant flow-rate by means of the submerged plate 7 gets poured through the outlet 13 into the filtration unit 11. The treated water therefore undergoes a rising motion in the reactor 2 and then a descending motion through the active carbon layer 12.

According to yet another embodiment of the plant according to the present invention, shown in FIG. 6, the main feed pipe joints the upper part of the reactor 2 which has a passage 14 for the removal of the water treated in its lower part. In a manner identical to that of the embodiment shown in FIG. 5, the plant has a filtration unit 11 organized in the form of an annular chamber positioned about the reactor 2 and comprising an active granular carbon layer 12 and a filtering floor 21. The wall between the reactor 2 and the filtration unit 11 is a siphon-shaped wall 15. The treated water coming from the reactor 2 goes via the aperture 14, rises in the siphon-shaped wall 15 and get poured into the upper part of the filtration unit 11. Consequently, the treated water has a descending motion in the reactor 2 and an also rising motion in the filtration unit 11.

The embodiment shown in FIG. 7, for its part, repeats the characteristics of the embodiment shown in FIG. 5, except in that the water feed pipe 1 reaches the upper part of the reactor 2 and joins the lower part of the reactor in such a way that the water undergoes a rising motion in the reactor 2 and then a descending motion in the active carbon filtration unit. Besides, the plant described does not have any plate for the equal distribution of the flow-rates of the water coming out of the feed pipe 1.

Figure 8:
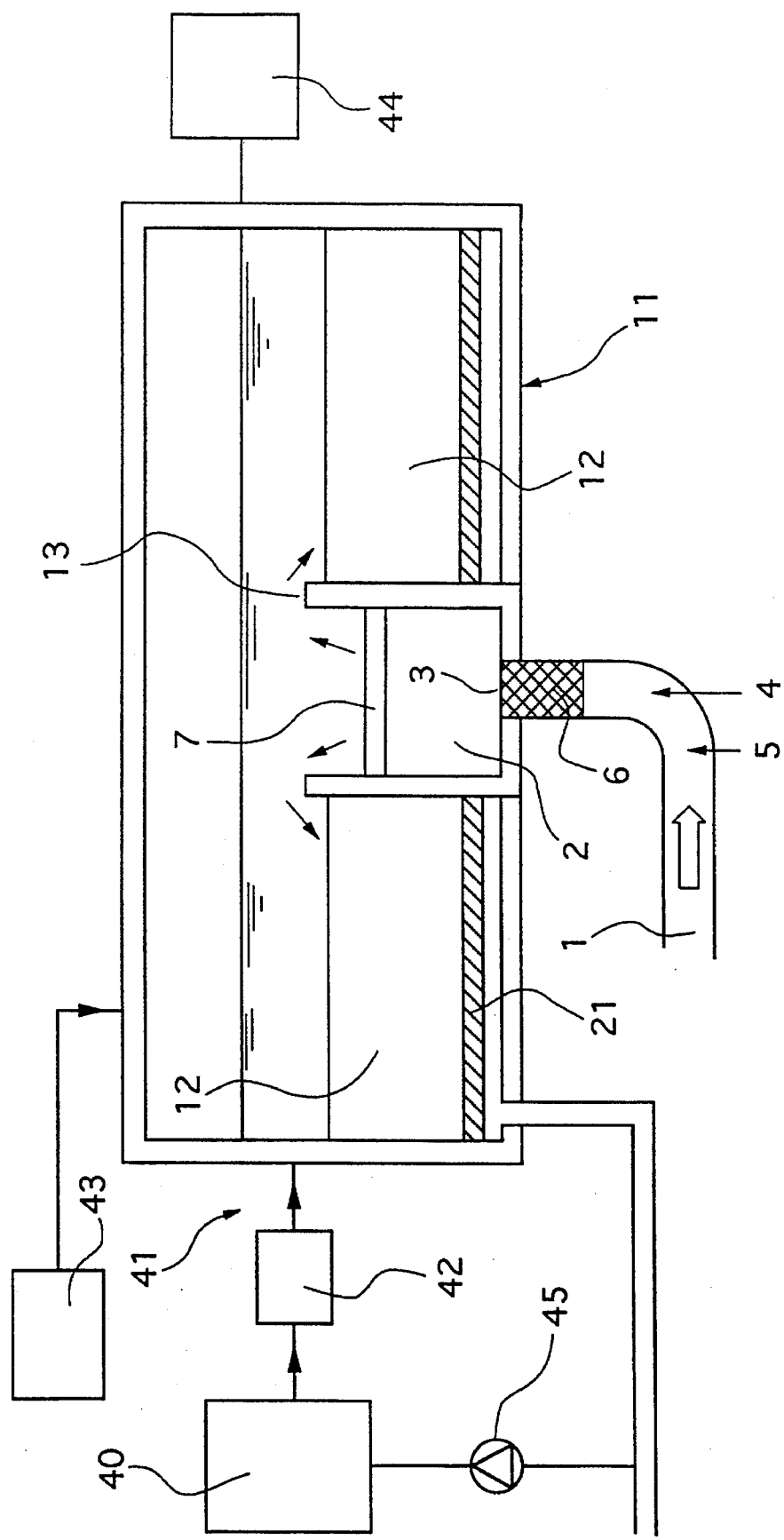
FIG. 8 shows a fifth embodiment of a plant according to the invention, in which means are designed to bring about the floating of certain pollutants present in the water treated in the reactor.

According to the embodiment of the invention shown in FIG. 8, the plant includes a filtration unit and is designed so as to bring about the floating, in the reactor 2, of the pollutants such as the mineral compounds and comprises, to this effect:

means 40 for the production of ozone over-saturated water from the water coming out of the reactor 2;

means 41 for the introduction of the over-saturated water formed into the reactor 2;

means 43 for the introduction of at least one coagulant substance into the reactor 2, and, means 44 for the removal of the flocs formed on the surface of the reactor.

A part of the water coming out of the reactor is pumped by means of a pump 45 to the ozone over-saturation means.

The means for the introduction of the ozone over-saturated water thus formed include a pressure-reducing device 42 enabling the formation of ozone micro-bubbles which, combined with the action of the coagulant substance, can be used to bring about the floating of the pollutants such as the metals which are then removed by the means 44. There is then no risk that the flocs formed will clog the filtration unit 12.

It will be noted that, to enable efficient action of the micro-bubbles, the pressure-reducing device should be designed so as to be as close as possible to the point at which ozone over-saturated water is introduced into the reactor 2.

Figure 9:
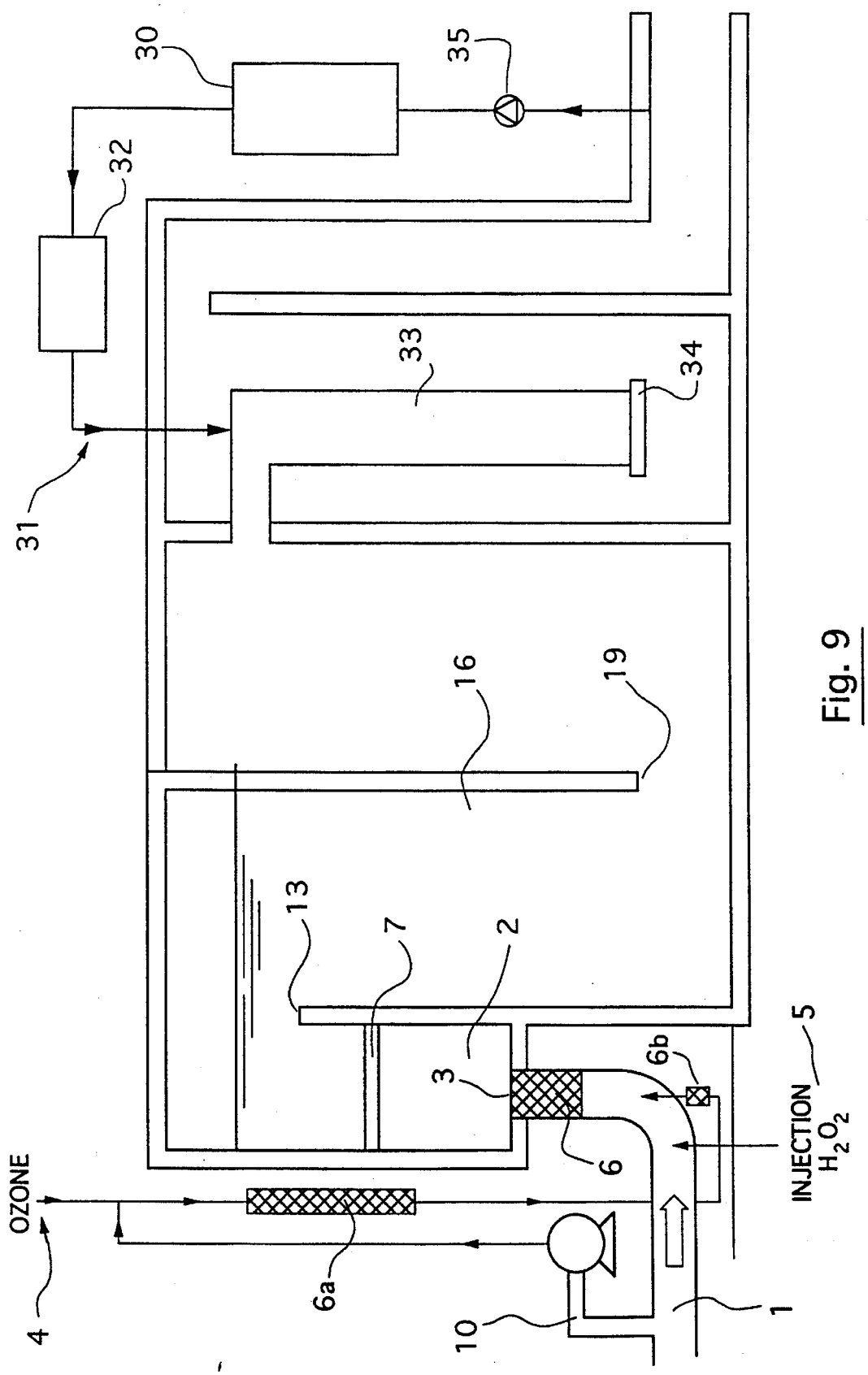
FIG. 9 shows a sixth embodiment of a plant according to the invention in which ozone reinjection means are planned at the outlet of the reactor.

According to another embodiment shown in FIG. 9, the plant does not include any filtration unit and comprises means 30 for the ozone over-saturation of a part of the water coming out of the plant. This water is pumped by means of the pump 35.

The plant furthermore comprises means 31 for the reintroduction of this ozone over-saturated water into the water coming out of the reactor 2. These reintroduction means comprise a pressure-reducing device 32 enabling the formation of the ozone micro-bubbles into the treated water. The plant thus comprises two ozone injection points, one upstream from the reactor and one downstream. This may prove to be particularly valuable, notably when the plant does not include any filtration unit and when the ozone is rapidly consumed, in the case of rapid kinetic processes.

In order to enable the introduction of the ozone over-saturated water into the treated water, the outlet of the reactor is fitted out with a feed pipe 33 by which all the treated water passes. This feed pipe 33, which carries the treated water downwards, is provided with a spraying unit 34 constituted by a perforated plate. It is also possible to chose to provide the end of the feed pipe 33 with a mixer or to provide for a porous structure to distribute the ozone micro-bubbles formed out of the ozone over-saturated water. It will be noted that, to enable efficient action by the ozone micro-bubbles, the pressure-reducing device will be placed as close as possible to the feed pipe 33.

The different embodiments of the plant according to the present invention described with reference to FIGS. 1 to 9 are not intended to limit scope of the invention. In particular, it is possible to envisage the use of complementary filtration units other than filtration units using granular active carbon, and possibly the coupling of the treatment of the untreated water described with a subsequent treatment such as chlorination. It is also possible to envisage the use of a static mixer in a position other than the vertical one.

What is claimed is:

1. A plant for the treatment of untreated water enabling the removal, at least partially, of micropollutants contained in the untreated water, said plant comprising:

a reactor having a lower part and an upper part;

at least one main feed pipe with an end that extends into at least the lower part of the reactor for feeding the untreated water into the reactor, the end of the feed pipe that extends into the reactor forming a submerged outlet;

means for injecting ozone into the untreated water within the main feed pipe or upstream of the main feed pipe;

means for injecting hydrogen peroxide into the untreated water within the main feed pipe or upstream of the main feed pipe;

at least one gas-liquid transfer system comprising at least one static mixer, said static mixer being located downstream from said ozone-injection means and said hydrogen peroxide injection means and upstream from said reactor; and means enabling the equal distribution of the flow of water that exits the feed pipe at the submerged outlet, the means of equal distribution permitting a reduction of the kinetic energy of the exiting water as the exiting water enters the reactor.

2. The plant according to claim 1, wherein said means of equal distribution comprise a submerged plate fixed above said outlet essentially perpendicularly to the direction of arrival of the water in said reactor, said plate having a width substantially equal to the width of said reactor, a solid central part, and an open-worked peripheral ring disposed about the solid central part, said solid central part facing the submerged outlet of the feed pipe.

3. The plant according to claim 2, wherein said central solid part of said submerged plate has a diameter substantially equal to the diameter of the feed pipe at the submerged outlet.

4. The plant according to claim 1, wherein said hydrogen peroxide injection means are placed upstream from said ozone injection means to permit injection of hydrogen peroxide into non-ozonized untreated water.

5. The plant according to claim 1, the plant further comprising a bypass loop communicating with said main feed pipe, the bypass loop comprising an auxiliary feed pipe for feeding the untreated water into said reactor up to a threshold value of the flow-rate of the untreated water, said main feed pipe providing for the feeding of the untreated water into said reactor as soon as the flow-rate of the untreated water is greater than said threshold.

6. The plant according to claim 5, wherein said ozone injection means are capable of injecting ozone into said auxiliary feed pipe.

7. The plant according to claim 1, wherein said ozone injection means and said hydrogen peroxide injection means enable the injection of ozone and hydrogen peroxide into the untreated water according to a constant $H_2O_2/O_3$ weight ratio.

8. The plant according to claim 1, wherein said ozone injection means and said hydrogen peroxide injection means enable the injection of ozone and hydrogen peroxide into the untreated water according to a constant $H_2O_2/O_3$ weight ratio of at least 0.5 g/g.

9. The plant according to claim 1, the plant further comprising a filtration unit positioned downstream from said reactor, said filtration unit permitting enhanced removal of residual micropollutants remaining in water that exits the reactor.

10. The plant according to claim 9, wherein said filtration unit comprises one or more layers of active granular carbon, such that residual micropollutants contained in the water coming out of said reactor are retained by adsorption on said active granular carbon.

11. The plant according to claim 9, wherein said filtration unit is positioned co-cylindrically with respect to said reactor, said reactor forming a first central chamber and said filtration unit forming a second annular chamber disposed about the first central chamber.

12. The plant according to claim 9, wherein the submerged outlet of said feed pipe is located in the lower part of said reactor, and wherein the upper part of said reactor includes a discharge point enabling water exiting the reactor to be conveyed towards said filtration unit in such a way that permits the treated water to flow upward in said reactor and downward in said filtration unit.

13. The plant according to claim 12, wherein the end of said feed pipe extends into the upper part of the reactor.

14. The plant according to claim 9, wherein the submerged outlet of said feed pipe extends into the upper part of the reactor and permits water to descend in said reactor and permits water exiting the reactor to move upward through said filtration unit.

15. The plant according to claim 14, wherein the submerged outlet of said feed pipe terminates in the upper part of the reactor.

16. The plant according to claim 9, the plant further comprising a wall located between said reactor and said filtration unit, the wall forming a siphon that permits the water to flow downward in said reactor and in said filtration unit.

17. The plant according to claim 9, the plant further comprising a wall located between said reactor and said filtration unit, the wall forming a siphon that permits the water to rise in said reactor and in said filtration unit.

18. The plant according to claim 1, wherein said hydrogen peroxide injection means comprise a dynamic or static dilution element enabling the injection of diluted hydrogen peroxide into the untreated water.

19. The plant according to claim 1, wherein said hydrogen peroxide injection means permit the injection of concentrated hydrogen peroxide into the untreated water.

20. The plant according to claim 1, the plant further comprising:

means for the over-saturating the untreated water with ozone;

means for the introduction of the over-saturated water into the reactor, means for the introduction of at least one coagulant substance into the reactor to form flocs, and means for the removal of flocs formed in the plant.

21. The plant according to claim 1, the plant further comprising means for the ozone over-saturation of at least a part of the treated water coming out of said plant and means for the injection of ozone over-saturated water back into water located in the plant.

22. The plant according to claim 1, the plant further comprising means for pressurizing water to be treated in said reactor to permit the reactor, or the reactor and the filtration unit, to operate under pressure.

* * * * *

UNITED STATES PATENT AND TRADEMARK OFFICE
CERTIFICATE OF CORRECTION

PATENT NO. : 5,578,205
DATED : NOVEMBER 26, 1996
INVENTOR(S) : NATHALIE MARTIN

It is certified that error appears in the above-indentified patent and that said Letters Patent is hereby corrected as shown below:

Col. 1, line 60 delete "$O_{3/1}$", insert --$O_3/l$--

Col. 2, line 1, delete "$O_{3/1}$", insert --$O_3/l$--

Col. 7, line 8, delete "$m_3$", insert --$m^3$--

Col. 8, line 53 (first line beneath Table I), delete "$H_2O_{2/O3}$", insert --$H_2O_2/O_3$--

Col. 11, line 52, delete "$H_2O_{2/O3}$", insert --$H_2O_2/O_3$--

Signed and Sealed this

Twenty-first Day of October 1997

Attest:

BRUCE LEHMAN

*Attesting Officer*    *Commissioner of Patents and Trademarks*